US008442993B2

(12) United States Patent
Xu (10) Patent No.: US 8,442,993 B2
(45) Date of Patent: May 14, 2013

(54) RULESET IMPLEMENTATION FOR MEMORY STARVED SYSTEMS

(75) Inventor: George Jijiang Xu, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 12/946,890

(22) Filed: Nov. 16, 2010

(65) Prior Publication Data

US 2012/0124078 A1    May 17, 2012

(51) Int. Cl.
    *G06F 7/00* (2006.01)
(52) U.S. Cl.
    USPC ............................. 707/769; 707/720; 707/706
(58) Field of Classification Search .................. 707/769, 707/706, 720
    See application file for complete search history.

(56) References Cited

U.S. PATENT DOCUMENTS

| 6,691,166 | B1 | 2/2004 | Gasior et al. | |
| 2007/0156655 | A1 | 7/2007 | Butler et al. | |
| 2008/0046462 | A1* | 2/2008 | Kaufman et al. | 707/102 |
| 2008/0208822 | A1 | 8/2008 | Bozkaya et al. | |
| 2009/0019022 | A1 | 1/2009 | Schallert et al. | |
| 2010/0017442 | A1* | 1/2010 | Kaijima et al. | 707/201 |
| 2012/0117509 | A1* | 5/2012 | Powell et al. | 715/786 |

FOREIGN PATENT DOCUMENTS

WO    WO0075849 A2    12/2000

OTHER PUBLICATIONS

"4.C-JDBC Driver," <http://c-jdbc.ow2.org/current/doc/userGuide/html/as01s04.html>, viewed Jul. 19, 2010.
"WS-JDBC (Web Service—Java DataBase Connectivity)," <http://ws-jdbc.sourceforge.net/>, viewed Jul. 19, 2010.
"LDBC Liberty Database Connectivity," <http://idbc.sourceforge.net/html/overview.html>, viewed Jul. 19, 2010.
Richter, "Merging Partial Result Sets From Multiple Source of DB2 for Linux, UNIX, and Windows and WebSphere Process Server Business Process Choreographer," <http://www.ibm.com/developerworks/websphere/library/techarticles/0710_richter/0710_richter.html>, Oct. 24, 2007.
Sathaye, "Re: [appengine-java] JIQL and SQL on appengine," MarkLogic Corporation, Mar. 30, 2010.

* cited by examiner

*Primary Examiner* — Cindy Nguyen
(74) *Attorney, Agent, or Firm* — Matthew B. Talpis; Gregory K. Goshorn; Greg Goshorn, P.C.

(57) ABSTRACT

Provided are techniques for retrieval of data from a data store, including techniques for receiving a request for a dataset corresponding to stored data, generating a first handle to the dataset, generating a plurality of parameters corresponding to the dataset, such that each parameter of the plurality of parameters corresponds to a distinct subset of the dataset, generating a first internal handle based upon the first handle and corresponding to a first parameter of the plurality of parameters, executing a data retrieval request based upon the first internal handle to retrieve a first subset of the dataset, receiving a navigation request corresponding to the first internal handle, navigating, if possible, the first subset in accordance with the navigation request and, when navigating the first subset in accordance with the navigation request is not possible, generating a second internal handle corresponding to a second parameter of the plurality of parameters.

24 Claims, 4 Drawing Sheets

RULESET IMPLEMENTATION FOR MEMORY STARVED SYSTEMS

FIELD OF DISCLOSURE

The claimed subject matter relates generally to memory management in a computing system and, more specifically, to the management of data queries results.

SUMMARY

Provided are techniques for the management of search queries that may generate search results containing too much data for a particular computing system to efficiently handle. Examples of application programming interfaces (APIs) that may encounter this issue include, but are not limited to, JAVA® Database Connectivity (JDBC), published by Sun Microsystems, Inc. of Santa Clara, Calif., and Open Database Connectivity (ODBC). Briefly, known approaches to the issue include the following:

1) Server Side Cursor by Setting "selectMethod=cursor" in JDBC
   By default, a JDBC driver uses a "client" or "direct" cursor approach in which case the driver retrieves all of a requested result set and stores the requested records in local memory. This approach may cause the driver to run out of memory. In contrast, a server side cursor retrieves one row of data at a time.
2) JDBC Adaptive Buffering
   In this method, a JDBC driver retrieves statement execution results for an SQL server as an application needs them and discards the results as soon as the application can no longer access the results.
3) JDBC InsensitiveResultSetBufferSize
   In this method, a JDBC driver employs a parameter to determine how much memory to buffer the result set. The buffer size is set at a connection level.
4) Upgrade to 64-bit Operating System
   A 64-bit system enables applications to access more memory address space, thereby mitigating memory limitations.
5) Splitting an Application into Multiple Systems
   In this method, smaller systems imply less data per system possibly avoiding some memory issues.

Each of approaches 1-5 may provide some relief from the disclosed memory issues but often raising other issues such as, but not limited to, increased client/server traffic, lack of control of amount of memory used for buffering, vendor compatibility issues, requirements for upgrades to equipment, software, licenses and so on.

Provided are techniques for the improvement of retrieval of data from a data store, including a method, apparatus and computer programming product for receiving a request for a dataset corresponding to stored data, generating a first handle to the dataset, generating a plurality of parameters corresponding to the dataset, such that each parameter of the plurality of parameters corresponds to a distinct subset of the dataset, generating a first internal handle based upon the first handle and corresponding to a first parameter of the plurality of parameters, executing a data retrieval request based upon the first internal handle to retrieve a first subset of the dataset, receiving a navigation request corresponding to the first internal handle, navigating, if possible, the first subset in accordance with the navigation request and, when navigating the first subset in accordance with the navigation request is not possible, generating a second internal handle corresponding to a second parameter of the plurality of parameters, such that the second parameter is in accordance with the navigation request and executing the second data retrieval request based upon the second internal handle to retrieve a second subset of the dataset corresponding to the second parameter.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally he referred to herein as a "circuit," "module" or "system." Furthermore, aspects of the present invention may take the form of a computer program product embodied in one or more computer readable medium(s) having computer readable program code embodied thereon.

One embodiment, in accordance with the claimed subject, is directed to a programmed method for efficient memory management during database operations. The term "programmed method", as used herein, is defined to mean one or more process steps that are presently performed; or, alternatively, one or more process steps that are enabled to be performed at a future point in time. The term 'programmed method' anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Any combination of one or more computer readable medium(s) may be utilized. The computer readable medium may be a computer readable signal medium or a computer readable storage medium. A computer readable storage medium may be, for example, but not limited to. an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may he transmitted using any appropriate medium, including but not limited to wireless, wireline, optical fiber cable. RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
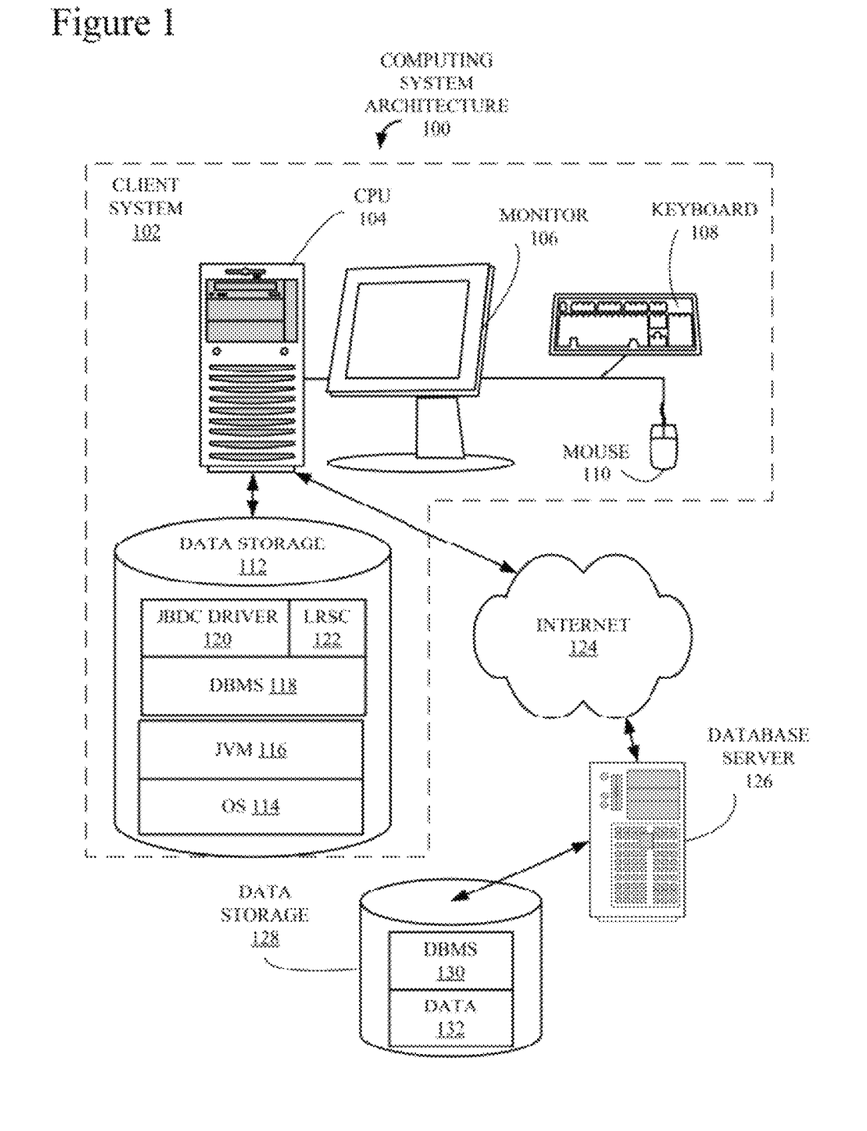
FIG. 1 is a computing system architecture that may implement the claimed subject matter.

Turning now to the figures, FIG. 1 is a block diagram of one example of a computing system architecture 100 that may implement the claimed subject matter. A client system 102 includes a central processing unit (CPU), or processor, 104, coupled to a monitor 106, a keyboard 108 and a pointing device, or mouse, 110, which together facilitate human interaction with computing system 100 and client system 102. Also included in client system 102 and attached to CPU 104 is a data storage 112, which may either be incorporated into CPU 104 i.e. an internal device, or attached externally to CPU 104 by means of various, commonly available connection devices such as but not limited to, a universal serial bus (USB) port (not shown).

Data storage 112 is illustrated storing an operating system (OS) 114, a JAVA® Virtual Machine (JVM) 116 and a database management system (DBMS) 118, all of which will be familiar to those with skill in the relevant art. In addition, data storage 112 stores a JAVA® Database Connectivity (JDBC) driver 120 that provides access to DBMS 118 via JVM 116. Also stored on data storage 112 is an abstraction layer designed to run on top of JDBC driver 120, or a Large Result Set component (LRSC) 122. A user or programmer makes data access requests to DBMS 118 by employing LRSC 122 rather than JDBC driver 120 in accordance with the disclosed technology. LRSC 122 runs in conjunction with JDBC driver 120 in the sense that, in one embodiment, a call to LRSC 122 is processed and passed as a series of calls to JDBC driver 120. In this manner, a call to LRSC 122 is consistent with a call placed instead to JDBC driver 120. Further, LRSC 122: 1) Provides support for multiple JDBC vendors and database providers; 2) Performs as fast as the convention client cursor approach (direct cursor); 3) Provides the ability to control how much memory is used; 4) Provides memory control at the statement level instead of connection level; and 5) Is easy to integrate into existing applications. LRSC 122 is explained in more detail below in conjunction with FIGS. 2-4.

Client system 102 and CPU 104 are connected to the Internet 124, which is also connected to a database server 126. Although in this example, CPU 104 and server 126 are communicatively coupled via the Internet 124, they could also be coupled through any number of communication mediums such as, but not limited to, a local area network (LAN) (not shown). Server 126 is coupled to a data storage 128 which, like data storage 112, may either he incorporated into server 126 i.e. an internal device, or attached externally to server 126 by means of various, commonly available connection devices such as but not limited to, a universal serial bus (USB) port (not shown). In addition, functionality associated with data storage 128 may be performed by one or more arrays of data storage devices in any configuration familiar to those with skill in the art. Data storage 128 is illustrated storing a DBMS 130 with associated data 132. Further, it should be noted there are many possible computing system configurations, of which computing system 100 is only one simple example.

Figure 2:
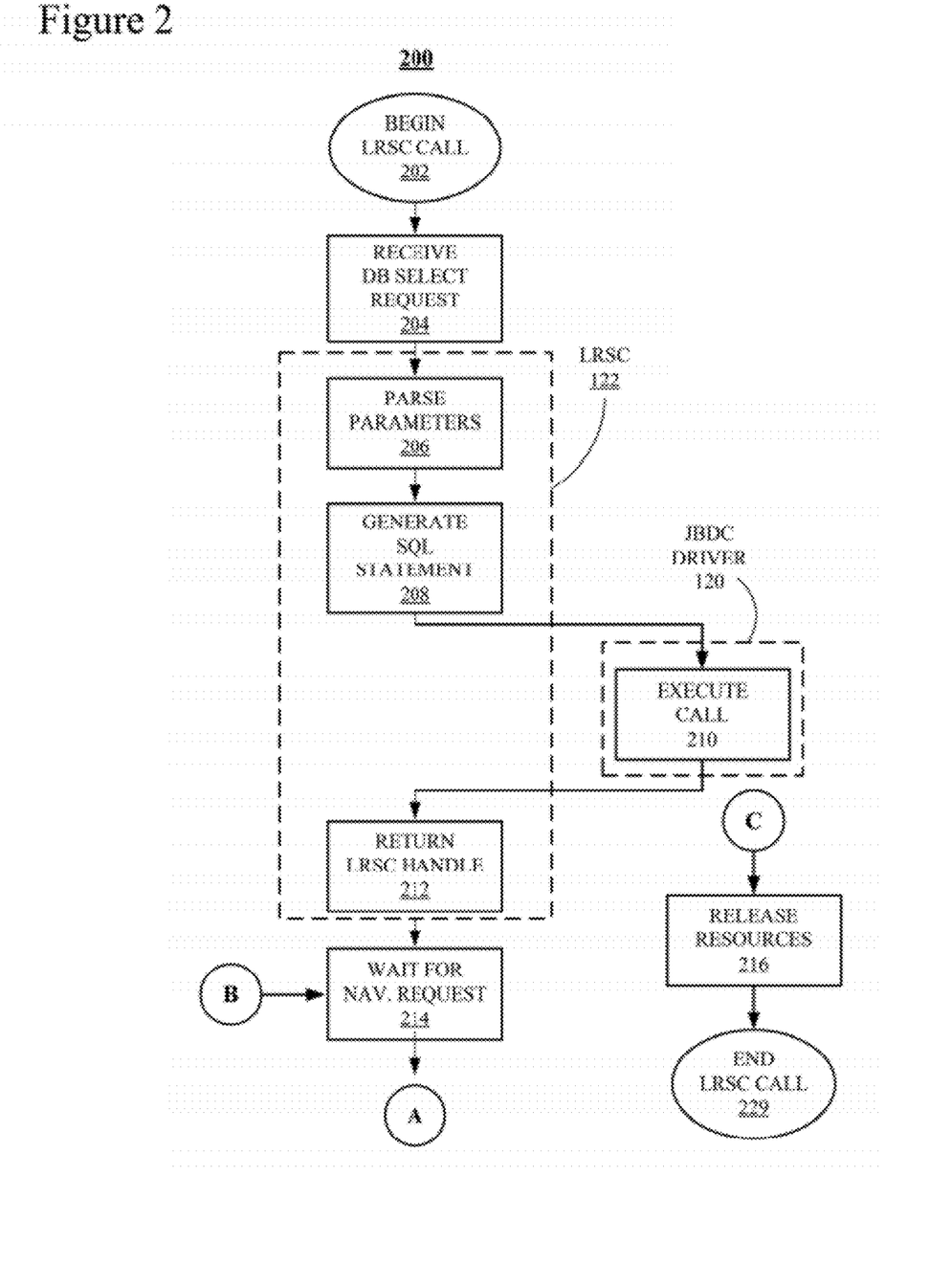
FIG. 2 is a flow chart of a LRSC call process in accordance with the claimed subject matter.

FIG. 2 is a flow chart of a LRSC call process 200 in accordance with the claimed subject matter. In this example, some logic associated with process 200 is stored on data storage 112 (FIG. 1) as part of LRSC 122 (FIG. 1) and some logic is associated with JBDC driver 120 (FIG. 1) as indicated by dotted lines. In this example, both LRSC 122 and JBDC 120 are executed on CPU 104 of client system 102 (FIG. 1).

Process 200 starts in a "Begin Large Result Component (LRSC) Call" block 202 and proceeds immediately to a "Receive Database (DB) Select Request" block 204. During processing associated with block 204, process 200 receives a database DB access request, in this example, in the form of a SQL select request. In the following example, a user application (not shown) calls LRSC 122 with a request for access to data 132 (FIG. 1) stored on database server 126 (FIG. 1). During processing associated with a "Parse Parameters" block 206, process 200 parses the parameters with which LRSC 122 was called. Examples of calling parameters include, but are not necessarily limited to, the following:

- selectSQL—a variable of type string that is typically a search, or select, statement for which a large number of data records are expected to be returned;
- connection—a variable of type JDBC connection object that describes the connection that is to be utilized for the select statement;
- target—a variable of type string that specifies a SQL target keyword that is to be replaced;
- replacement—a variable of type string that stored a partial SQL statement with filters with which to replace the variable stored in selectSQL; and
- fetchIncremental—a variable of type integer that specifies the number of objects to be retrieved at one time.

Some methods that may be utilized to control the operation of process 200 include, but are not limited to the following:

- setReadConsistent—a method that returns a void and is called with a parameter, sqlLockString, which is a variable of type string, and enables database isolation level and table lock techniques to achieve the same level of reading consistency as the original SQL statement passed in select SQL; and
- releaseReadConsistent—a method that release any hold on database resources generated by the setReadConsistent method.

It should be understood that because the original SQL statement is rewritten by LRSC 122, the context of reading consistency is changed. Therefore, methods setReadConsistent and releaseReadConsistent enable the user application to maintain data consistency within the scope of the original SQL statement.

During processing associated with a "Generate SQL Statement" block 208, process 200 modifies the original SQL statement passed in the selectSQL parameter by filtering the data field identified by the target parameter with the filter identified by the replacement parameter. For example, with respect to the following parameters:

- selectSQL="select b.CMID, b.DESCR from TEST b order by b.CMID"
- connection=connection
- target="b.CMID"
- replacement="b.CMID>=? and b.CMID<? order by b.CMID"

LRSC 122 would modify the selectSQL parameter to the following:

- select b.CMID, b.DESCR from TEST b where b.CMID>=? and b.CMID<? order by b.CMID.

At this points the '?'s are replaced. in the first iteration of process 200 with values that represent a beginning range of the requested database field b.CMID and returns a number of records equal to the value specified by the fetchIncremental method. During processing associated with an "Execute Call" block 210, process 200 calls JBDC driver 120 (FIG. 1) with the SQL statement generated during processing associated with block 208, which, in this example, results in the generation of calls to DBMS 118 (FIG. 1) and DBMS 130 (FIG. 1) for the requested data from data 132.

During processing associated with a "Return LRSC Handle" block 212, process 200 returns a pointer, or "handle," that corresponds to the expected result set of the original SQL statement, i.e. a "LargeResultSet" handle that conforms to a standard JDBC interface and incorporates typical JDBC driver 120 result set behavior. Thereafter, a subset of the results is retrieved for the calling application to display (see 266, FIGS. 3 and 282, FIG. 4) on, in this example monitor 106 (FIG. 1). It should be noted that a user application may display, present or process one or more rows at a time. Once a user has viewed or processed the rows that have been presented, typically a request for another subset of the results, i.e. a navigation request, is initiated. During a "Wait for Navigation Request" block 214, process 200 waits for such a navigation request, which in this simplified example may either be a request for the next or previous row or set of rows.

Once a navigation request has been received, control proceeds to a transition point A, which is explained in more detail below in conjunction with FIG. 3. Reentry to block 214, via transition point B is explained in detail below in conjunction with FIGS. 3 and 4. Process 200 enters a "Release Resources" block 216 via a transition point C, which is explained in conjunction with FIGS. 3 and 4. During processing associated with block 216, process 200 releases any locked data resources at database server 126, typically by calling method releaseReadConsistent. In addition, the LRSC handle returned during block 212 is released. Finally, control proceeds to an "End LRSC process" block 229 in which process 200 is complete.

Figure 3:
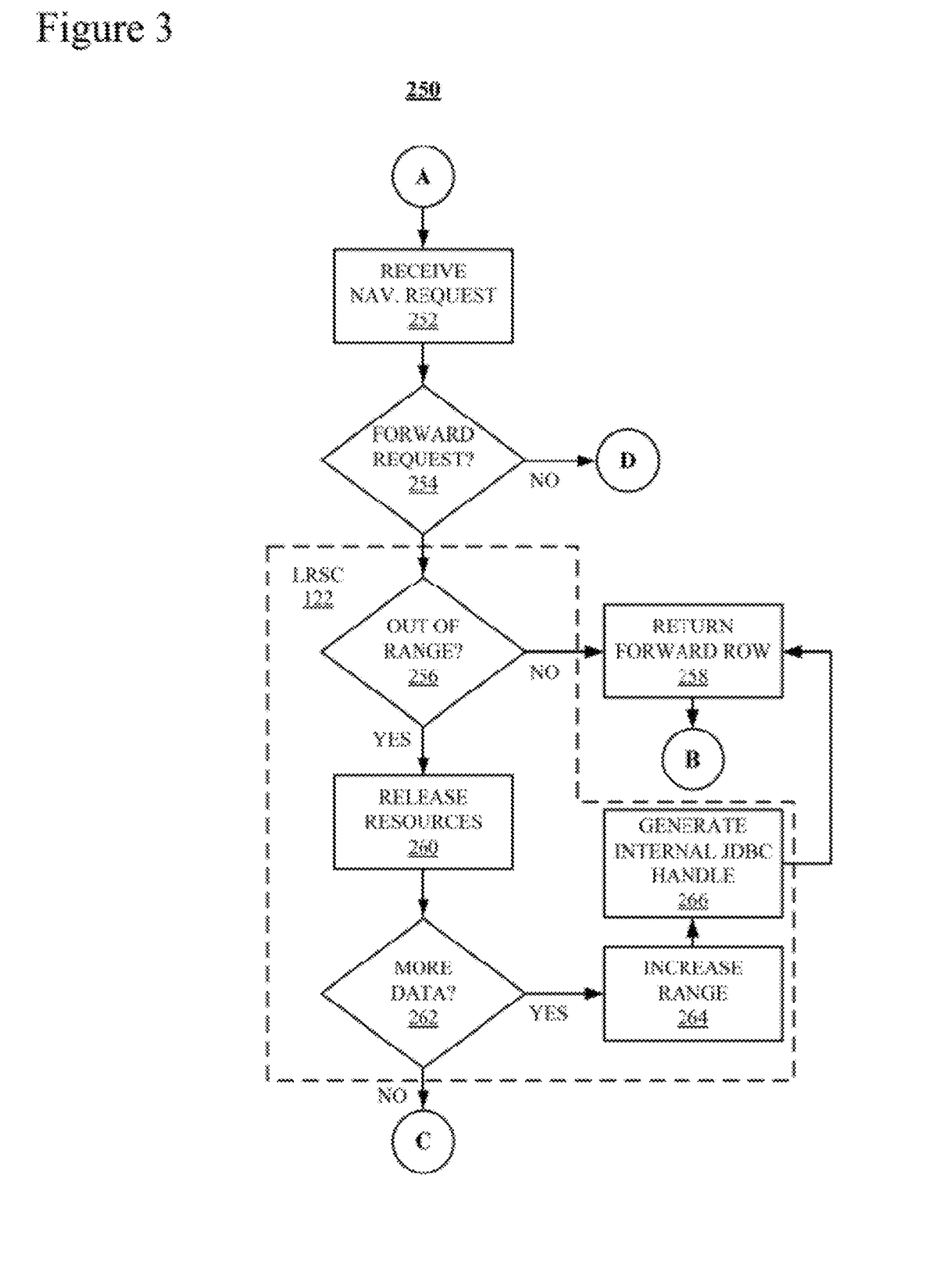
FIG. 3 is a flow chart of processing associated with LRSC call process of FIG. 2.

FIG. 3 is a flow chart of processing 250 associated with LRSC call process 200 of FIG. 2. Process 250 is entered via transition point A (FIG. 2) and proceeds. immediately to a "Receive Navigation (Nay.) Request" block 252. During processing associated with block 252, process 250 receives a navigation request typically initiated by a user (see 214, FIG. 2). During processing associated with a "Forward Request?" block 254, process 250 determines whether or not the navigation request received during block 252 is a request for the a row that is in a forward direction in the result set, with the alternative being a row in a backward direction. It should be understood, that a forward or backward row request may be for the next or previous row, respectively, in a sequence of rows or a request for jump, for example one hundred (100) rows, either forward or backward. Further, an additional option may be simply to terminate the processing and proceed to a transition point C, described below.

If process 250 determines that the navigation request is not a request for a row forward of the current row position as defined by an internal JDBC handle, which is explained below, control proceeds to a transition point D, which is explained in more detail below in conjunction with FIG. 4. If process 250 determines that a request for a row in a forward direction was received, control proceeds to an "Out of Range?" block 256. During processing associated with block 256, process 250 determines whether or not the navigation request received during block 252 is a request for a row of data 132 (FIG. 1) within the range of the handle returned during the processing associated with the current internal JDBC handle, i.e. the current results. If determined that the navigation request may be satisfied by a row within the scope of the current handle, process 250 proceeds to a "Return Forward Row" block 258. During processing associated with block 258, LRSC 122 (FIG. 1) returns the requested row, i.e. the next row or a row corresponding to a jump, within the current results for display on monitor 106 and returns, via transition point B to Wait for Nay. Request block 214 and processing continues as described above in conjunction with FIG. 2.

If during processing associated with block 256, process 250 determines that the navigation request requires a row or rows outside the current results, control proceeds to a "Release Resources" block 260. During processing associated with block 260, process 250 releases resources, including the current internal JDBC handle, in client system 102 that correspond to the current range and, in this manner, conserves resources of client system 102. It should be noted that during a first iteration through process 250 a LRSC handle has not yet been generated and, therefore, any navigation request received during block 252 is determined to out of range during block 256. Furthermore, during the first iteration, there would not he either resources or a LRSC handle to release.

During processing associated with a "More Data?" block 262, process 250 determines whether or not the navigation request received during block 252 can be satisfied within the limits defined by the original query, i.e. the SQL statement stored in the selectSQL parameter, described above in conjunction with FIG. 2. If so, process 250 proceeds to an "Increase Range" block 264, during which process 250 increases the range of the target parameter, in the example b.CMID. to retrieve a handle that represents another set of results. During a "Generate internal JDBC Handle" block 266, process 250 generates a new internal (to LRSC 122) JDBC handle corresponding to a next result set. It should be noted the internal JDBC handle is different than the LRSC, or LargeResultSet, handle returned during Return LRSC Handle block 212 (FIG. 2). The generated internal JDBC handle is employed within LRSC 122 and the use is transparent to the user or application that initiated the data request. Typically, the generation on an internal JDBC handle is done by modifying the original SQL statement and executing a SQL call (see 208 and 210, FIG. 2). Processing then returns to Return Forward Row block 258 via the LRSC handle generated during processing associated with block 212 and processing continues as described above.

If during processing associated with block 262, process 250 determines that the end of the range defined by the selectSQL statement has been reached, control proceeds, via transition point C, to Release Resources block 218 (FIG. 2) during which processing continues as described above in conjunction with FIG. 2. It should be understood that processes 200 and 250 represent one simple example of an implementation of the claimed subject matter. For example, rather than a determination that data has been exhausted during block 262 initiating termination of process 200, the user may be presented with an option to return to the beginning of data 132 defined by selectSQL. In this case, the range would be reset to the original range by resetting, or regenerating, the internal JDBC handle during block 266 and process 250 would return to block 258 and processing would continue as described above. Those with skill in the computing arts will appreciate that there are many possible navigation option within the scope of the claimed subject matter.

The following are examples of successive SQL statements that might be generated by iterations through processes 200 and 250 in accordance with the claimed subject matter:

select b.CMID, b.DESCR from TEST b where b.cmid>=0 and b.cmid<100000 order by b.CMID;
select b.CMID, b.DESCR from TEST b where b.cmid>=100000 and b.cmid<200000 order by b.CMID;
select b.CMID, b.DESCR from TEST b where b.cmid>=200000 and b.cmid<300000 order by b.CMID;
select b.CMID, b.DESCR from TEST b where b.cmid>=300000 and b.cmid<400000 order by b.CMID;
select b.CMID, b.DESCR from TEST b where b.cmid>=400000 and b.cmid<500000 order by b.CMID; and
select b.CMID, b.DESCR from TEST b where b.cmid>=500000 and b.cmid<600000 order by b.CMID.

Figure 4:
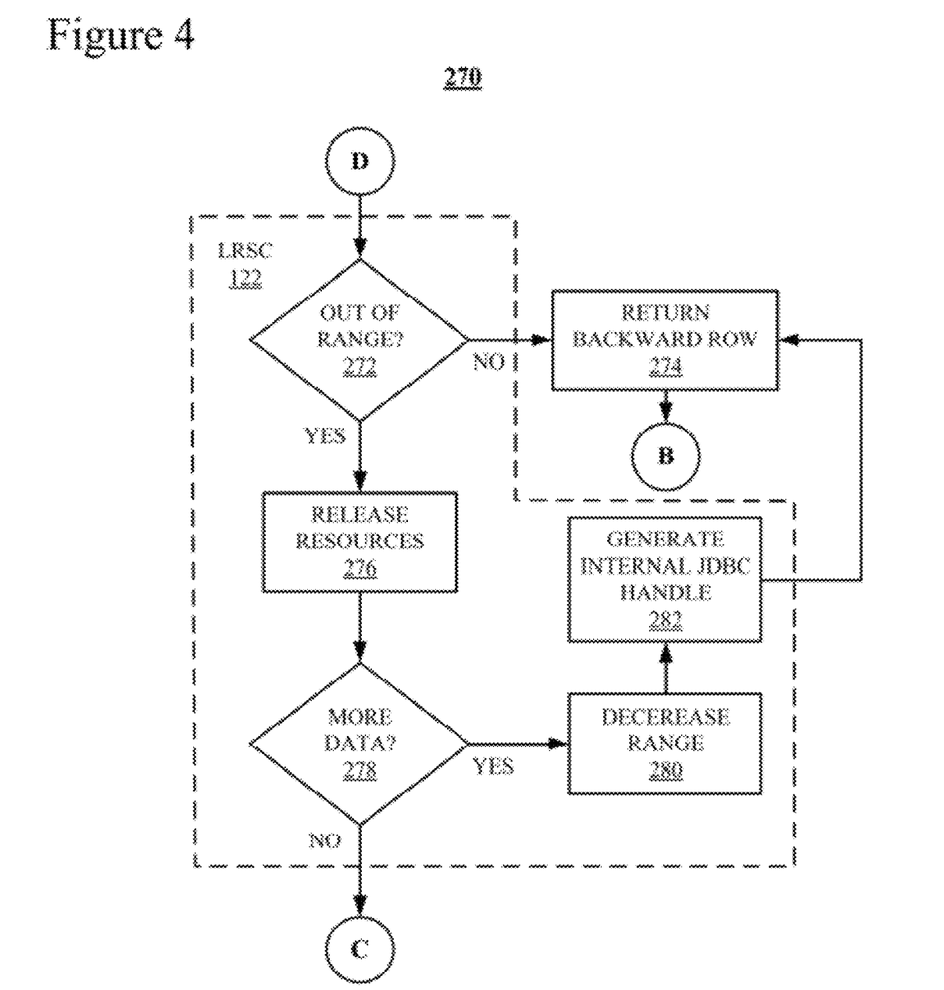
FIG. 4 is a flow chart of processing associated with LRSC call process of FIG. 2.

FIG. 4 is a flow chart of processing 270 associated with LRSC process 200 of FIG. 2. Process 270 is entered via transition point D (FIG. 3) and proceeds immediately to an "Out of Range?" block 272, During processing associated with block 258, process 250 determines whether or not the navigation request received. during block 254 (FIG. 3) is a request for a row of data 132 (FIG. 1) backwards within the range of a current internal JDBC handle, i.e. the current results, if such a handle has been generated in previous iterations through processes 200 and 250. If determined that the navigation request may be satisfied by a row within the scope of the current handle, process 270 proceeds to a "Return Backward Row" block 274 via the LRSC handle. As explained above with respect to FIG. 3, during a first iteration through processes 200, 250 and 270, an internal JBDC handle has not yet been generated and, therefore, any navigation request received during block 252 (FIG. 3) is determined to out of range during block 272. During processing associated with block 274, LRSC 122 (FIG. 1) returns the requested row, i.e. the previous row or a row represented by a jump within the current results for display on monitor 106 and returns, via transition point B to Wait for Nay. Request block 214 and processing continues as described above in conjunction with FIG. 2.

If during processing associated with block 272, process 270 determines that the navigation request requires a row outside the current results, control proceeds to a "Release Resources" block 276. During processing associated with block 276, process 270 releases resources, if any, in client system 102 that correspond to the current range corresponding to the current internal JDBC handle and, in this manner, conserves resources of client system 102. During processing associated with a "More Data?" block 278, process 270 determines whether or not the navigation request received during block 254 can be satisfied within the limits defined by the original query. i.e. the SQL statement stored in the selectSQL parameter, described above in conjunction with FIG. 2. If so, process 270 proceeds to an "Decrease Range" block 280, during which process 270 decreases the range of the target parameter, in the example b.CMID, to generate a new internal JDBC handle that represents another set of results. During a "Generate Internal JDBC Handle" block 282, process 270 generates a new internal JDBC handle corresponding to a next result set that is backward in direction. Typically, the generation on a new LRSC handle is done by modifying the original SQL statement and executing a SQL call (see 208 and 210, FIG. 2). Processing then returns to block 274 and processing continues as described above.

If during processing associated with block 278. process 270 determines that the end of the range defined by selectSQL has been reached, control proceeds, via transition point C, to Release Resources block 218 (FIG. 2) during which processing continues as described above in conjunction with FIG. 2. It should be understood that processes 200, 250 and 270 represent one simple example of an implementation of the claimed subject matter. For example, rather than an Out of Data determination of block 278 initiating termination of process 200, the user may be presented with an option to return to the beginning of data 132 defined by selectSQL. In this case, the range would be reset to the original range (see 206, FIG. 2) by resetting, or regenerating the internal JDBC handle during processing associated with block 282 and process 270 would return to block 274 and processing would continue as described above. Those. with skill in the computing arts will appreciate that there are many possible navigation option within the scope of the claimed subject matter.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will he apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order. depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

I claim:

1. A method for the efficient use of computing resources, comprising:
    receiving a request for a dataset corresponding to stored data;
    generating, by a requestor, a first handle to the dataset;
    generating, by the requestor, a plurality of parameters corresponding to the dataset, such that each parameter of the plurality of parameters corresponds to a distinct subset of the dataset;
    generating, by the requestor, a first internal handle based upon the first handle and corresponding to a first parameter of the plurality of parameters;
    executing a data retrieval request based upon the first internal handle to retrieve a first subset of the dataset;
    receiving a navigation request corresponding to the first internal handle;
    navigating, if possible, the first subset in accordance with the navigation request; and
    in response to a determination that navigating the first subset in accordance with the navigation request is not possible, generating, by the requestor, a second internal handle corresponding to a second parameter of the plurality of parameters, such that the second parameter is in accordance with the navigation request; and
    executing the second data retrieval request based upon the second internal handle to retrieve a second subset of the dataset corresponding to the second parameter.

2. The method of claim 1, further comprising releasing the first internal handle in response to the generation of the second internal handle.

3. The method of claim 1, wherein the navigation request is a request for a next row in the dataset.

4. The method of claim 1, wherein the navigation request is a request for a previous row in the dataset.

5. The method of claim 1, wherein the navigation request is a request for a jump to a row that is not the next or previous row.

6. The method of claim 1, further comprising releasing the first handle and any unreleased internal handle when the navigation request results in a request for data not included in the dataset.

7. The method of claim 1, wherein the large dataset handle conforms to Jaya database connectivity (JDBC) standards.

8. A method for the efficient use of computing resources, comprising:
    generating, by a requestor, a large dataset handle for retrieving a dataset, the dataset comprising a subset of stored data;
    generating, by the requestor, as plurality of parameters corresponding to the dataset, such that each parameter of the plurality of parameters corresponds to a distinct subset of the dataset and, when taken in combination, the distinct subsets comprise the entire dataset;
    generating, by the requestor, a first internal handle based upon the large dataset handle and corresponding to a first parameter of the plurality of parameters;
    executing a data retrieval request based upon the first internal handle to retrieve a first subset of the dataset;
    receiving a navigation request corresponding to the first internal handle;
    navigating, if possible, the first subset in accordance with the navigation request; and
    in response to a determination that navigating the first subset in accordance with the navigation request is not possible, generating, by the requestor, a second internal handle corresponding to a second parameter of the plurality of parameters, such that the second parameter is in accordance with the navigation request; and
    executing the second data retrieval request based upon the second internal handle to retrieve a second subset of the dataset corresponding to the second parameter.

9. The method of claim 8, further comprising releasing the first internal handle in response to the generation of the second internal handle.

10. The method of claim 8, wherein the navigation request is a request for a next row in the dataset.

11. The method of claim 8, wherein the navigation request is a request for a previous row in the dataset.

12. The method of claim 8, further comprising releasing the large dataset handle and any unreleased internal handle when the navigation request results in a request for data not within a scope corresponding to the large dataset handle.

13. The method of claim 8, wherein the large dataset handle conforms to Java database connectivity (JDBC) standards.

14. An apparatus for the retrieval of data from stored data, comprising:
- a processor;
- a computer-readable storage medium coupled to the processor; and
- logic, stored on the computer-readable storage medium and executed on the processor, for:
    - generating, by a requestor, a large dataset handle fir retrieving a dataset, the dataset comprising a subset of stored data;
    - generating, by the requestor, a plurality parameters corresponding to the dataset, such that each parameter of the plurality of parameters corresponds to a distinct subset of the dataset and, when taken in combination the distinct subsets comprise the entire dataset;
    - generating, by the requestor, a first internal handle based upon the large dataset handle and corresponding to a first parameter of the plurality of parameters;
    - executing a data retrieval request based upon the first internal handle to retrieve a first subset of the dataset;
    - receiving a navigation request corresponding to the first internal handle;
    - navigating, if possible, the first subset in accordance with the navigation request; and
    - in response to a determination that navigating the first subset in accordance with the navigation request is not possible, generating, by the requestor, a second internal handle corresponding to a second parameter of the plurality of parameters, such that the second parameter is in accordance with the navigation request; and
    - executing the second data retrieval request based upon the second internal handle to retrieve a second subset of the dataset corresponding, to the second parameter.

15. The apparatus of claim 14, the logic further comprising logic for releasing the first internal handle in response to the generation of the second internal handle.

16. The apparatus of claim 14, wherein the navigation request is a request for a next row in the dataset.

17. The apparatus of claim 14, wherein the navigation request is a request for a previous row in the dataset.

18. The apparatus of claim 14, the logic further comprising logic for releasing the large dataset handle and any unreleased internal handle when the navigation request results in a request for data not within a scope corresponding to the large dataset handle.

19. The apparatus of claim 14, wherein the large dataset handle conforms to Java database connectivity (JDBC) standards.

20. A computer programming product for the retrieval of data from stored data, comprising:
- a computer-readable storage medium; and
- logic, stored on the computer-readable storage medium for execution on a processor, for:
    - generating, by a requestor, a large dataset handle for retrieving a dataset, the dataset comprising a subset of stored data;
    - generating, by the requestor, as plurality of parameters corresponding, to the dataset, such that each parameter of the plurality of parameters corresponds to a distinct subset of the dataset and, when taken in combination, the distinct subsets comprise the entire dataset;
    - generating, by the requestor, a first internal handle based upon the large dataset handle and corresponding to a first parameter of the plurality of parameters;
    - executing a data retrieval request based upon the first internal handle to retrieve a first subset of the dataset:
    - receiving a navigation request corresponding to the first internal handle;
    - navigating, if possible, the first subset in accordance with the navigation request; and
    - in response to a determination that navigating the first subset in accordance with the navigation request is not possible, generating, by the requestor, a second internal handle corresponding to a second parameter of the plurality of parameters, such that the second parameter is in accordance with the navigation request; and
    - executing the second data retrieval request based upon the second internal handle to retrieve a second subset of the dataset corresponding to the second parameter.

21. The computer programming product of claim 20, the logic further comprising logic for releasing the first internal handle in response to the generation of the second internal handle.

22. The computer programming product of claim 20, wherein the navigation request is a request for a next row in the dataset.

23. The computer programming product of claim 20, wherein the navigation request is a request for a previous row in the dataset.

24. The computer programming product of claim 20, the logic further comprising logic for releasing the large dataset handle and any unreleased internal handle when the navigation request results in a request for data not within a scope corresponding to the large dataset handle.

* * * * *